United States Patent
Lee et al.

(10) Patent No.: US 9,305,348 B2
(45) Date of Patent: Apr. 5, 2016

(54) ROTATING 3D VOLUME OF DATA BASED ON VIRTUAL LINE RELATION TO DATUM PLANE

(71) Applicant: SAMSUNG MEDISON CO., LTD., Gangwon-do (KR)

(72) Inventors: Bong-heon Lee, Gangwon-do (KR); Jin-yong Lee, Gangwon-do (KR)

(73) Assignee: SAMSUNG MEDISON CO., LTD., Gangwon-Do (KR)

( * ) Notice: Subject to any disclaimer, the term of this patent is extended or adjusted under 35 U.S.C. 154(b) by 356 days.

(21) Appl. No.: 13/924,136

(22) Filed: Jun. 21, 2013

(65) Prior Publication Data

US 2014/0003693 A1   Jan. 2, 2014

(30) Foreign Application Priority Data

Jun. 28, 2012   (KR) .................. 10-2012-0070232

(51) Int. Cl.
*G06K 9/00* (2006.01)
*G06T 7/00* (2006.01)
*G06T 19/00* (2011.01)
*G06T 3/60* (2006.01)

(52) U.S. Cl.
CPC ................. *G06T 7/0012* (2013.01); *G06T 3/60* (2013.01); *G06T 7/0042* (2013.01); *G06T 19/00* (2013.01); *G06T 2207/10081* (2013.01); *G06T 2207/10088* (2013.01); *G06T 2207/10132* (2013.01); *G06T 2207/30048* (2013.01); *G06T 2219/008* (2013.01)

(58) Field of Classification Search
None
See application file for complete search history.

(56) References Cited

U.S. PATENT DOCUMENTS

| | | | |
|---|---|---|---|
| 6,545,678 B1 * | 4/2003 | Ohazama | 345/427 |
| 7,604,597 B2 | 10/2009 | Murashita et al. | |
| 8,073,215 B2 | 12/2011 | Lu et al. | |
| 8,265,363 B2 | 9/2012 | Orderud et al. | |
| 2007/0016019 A1 | 1/2007 | Salgo | |
| 2007/0071295 A1 * | 3/2007 | Jackson | 382/128 |
| 2008/0051652 A1 | 2/2008 | Ichioka et al. | |
| 2009/0153548 A1 | 6/2009 | Rabben et al. | |

(Continued)

FOREIGN PATENT DOCUMENTS

| | | | |
|---|---|---|---|
| JP | 2003-019134 A | 1/2003 | |
| JP | 2003-325511 A | 11/2003 | |

(Continued)

OTHER PUBLICATIONS

Korean Office Action issued in corresponding Korean Application No. 10-2012-0070232, dated Aug. 5, 2014, with English translation.

(Continued)

*Primary Examiner* — Jason Heidemann
(74) *Attorney, Agent, or Firm* — McDermott Will & Emery LLP

(57) ABSTRACT

A diagnosis imaging apparatus and an operation method thereof are provided. A diagnosis imaging apparatus includes: an image processing apparatus for detecting a first point and a second point on a heart wall of a valve of interest in a 3D volume data of a heart of a subject, rotating the 3D volume data to make a virtual line connecting the first point and the second point be parallel with a datum plane, and acquiring a 3D standard view of the valve of interest based on the rotated 3D volume data; and a display apparatus for displaying the 3D standard view.

13 Claims, 4 Drawing Sheets

(56) References Cited

U.S. PATENT DOCUMENTS

2010/0123715 A1\* 5/2010 Hansegard et al. ............ 345/419
2011/0190633 A1\* 8/2011 Kawagishi et al. ............ 600/443

FOREIGN PATENT DOCUMENTS

| JP | 2004-313651 A | 11/2004 |
| JP | 2010-179098 A | 8/2010 |
| KR | 10-2009-0029673 A | 3/2009 |

OTHER PUBLICATIONS

Notice of Allowance issued in Korean Application No. 10-2012-0070232, dated Jan. 29, 2015, with English translation.

\* cited by examiner

ROTATING 3D VOLUME OF DATA BASED ON VIRTUAL LINE RELATION TO DATUM PLANE

CROSS-REFERENCE TO RELATED PATENT APPLICATION

This application claims the benefit of Korean Patent Application No. 10-2012-0070232, filed on Jun. 28, 2012, in the Korean Intellectual Property Office, the disclosure of which is incorporated herein in its entirety by reference.

BACKGROUND OF THE INVENTION

1. Field of the Invention

The present invention relates to a diagnosis imaging apparatus and an operation method thereof.

2. Description of the Related Art

Diagnosis imaging apparatuses refer to medical imaging apparatuses such as ultrasound imaging apparatuses, computed tomography (CT) apparatuses, or magnetic resonance imaging (MRI) apparatuses.

Diagnosis imaging apparatuses may measure or evaluate characteristics of the heart and be used to diagnose whether heart disease is present, based on 3-dimensional (3D) volume data of the heart. For example, an ultrasound imaging apparatus may acquire 3D volume data of the heart of a subject via 3D echocardiography. Diagnosis imaging apparatuses may include display apparatuses for displaying a 2D plane image or a 3D image based on the 3D volume data. To display a 2D plane image of a desired cross-section of a user or a 3D-image at a desired viewpoint of a user on a display apparatus, further image processing, such as rotating 3D volume data, is necessary. Rotating the 3D volume data may be performed based on a user input received via an input apparatus such as a mouse or a knob button.

However, it is difficult that a user intuitively perceives the rotation of the 3D volume data, and thus the user may not accurately control the rotating of the 3D volume data. The user input may also delay the diagnosis time. A plane of interest may not be accurately displayed to the user, and diagnostic accuracy may be reduced.

Therefore, there is a demand for an efficient diagnosis imaging apparatus and an operation method thereof.

SUMMARY OF THE INVENTION

The present invention provides an efficient diagnosis imaging apparatus and an operation method thereof.

According to an aspect of the present invention, there is provided a diagnosis imaging apparatus including: an image processing apparatus for detecting a first point and a second point on a heart wall of a valve of interest in a 3D volume data of a heart of a subject, rotating the 3D volume data to make a virtual line connecting the first point and the second point be parallel with a datum plane, and acquiring a 3D standard view of the valve of interest based on the rotated 3D volume data; and a display apparatus for displaying the 3D standard view.

According to another aspect of the present invention, there is provided an operation method of a diagnosis imaging apparatus, the method including: detecting a first point and a second point on a heart wall of a valve of interest in a 3D volume data of a heart of a subject; rotating the 3D volume data to make a virtual line connecting the first point and the second point be parallel with a datum plane; and acquiring a 3D standard view of the valve of interest based on the rotated 3D volume data.

According to another aspect of the present invention, there is provided an image processing apparatus for detecting a first point and a second point on a heart wall of a valve of interest in a 3D volume data of a heart of a subject, rotating the 3D volume data to make a virtual line connecting the first point and the second point be parallel with a datum plane, and acquiring a 3D standard view of the valve of interest based on the rotated 3D volume data.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the present invention are described in detail with reference to the appended drawings.

Figure 1:
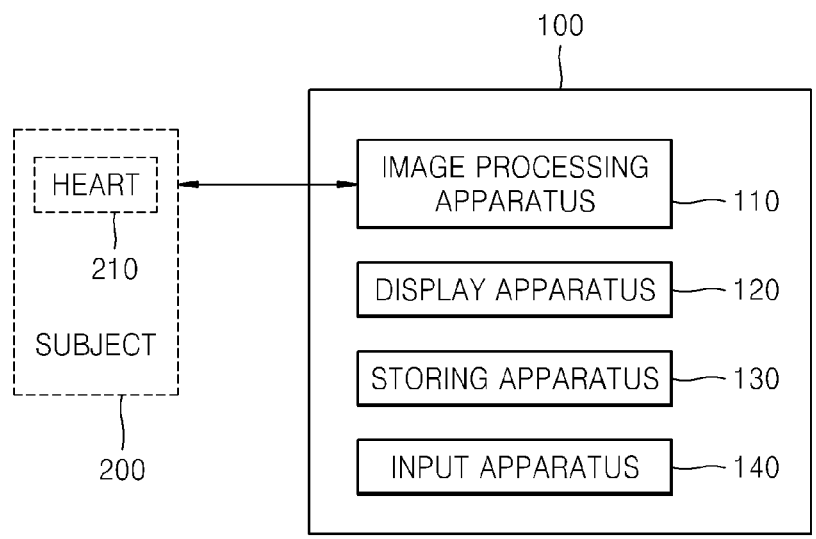
FIG. 1 is a block diagram of a diagnosis imaging apparatus according to an embodiment of the present invention.

FIG. 1 is a block diagram of a diagnosis imaging apparatus 100 according to an embodiment of the present invention.

Referring to FIG. 1, the diagnosis imaging apparatus 100 includes an image processing apparatus 110 and a display apparatus 120. The diagnosis imaging apparatus 100 may further include a storing apparatus 130 and an input apparatus 140. A subject 200 may be an animal body, including a human body, having the heart 210.

The diagnosis imaging apparatus 100 is an apparatus for measuring or evaluating characteristics of the heart 210 or for diagnosing whether the subject 200 has an illness in the heart 210, based on three-dimensional (3D) volume data of the heart 210 of the subject 200. In some embodiments, the diagnosis imaging apparatus 100 may be a medical imaging apparatus, such as an ultrasound imaging apparatus, a computed tomography (CT) apparatus, or magnetic resonance imaging (MRI) apparatus.

The image processing apparatus 110 acquires 3D volume image of the heart 210 of the subject 200.

Figure 2:
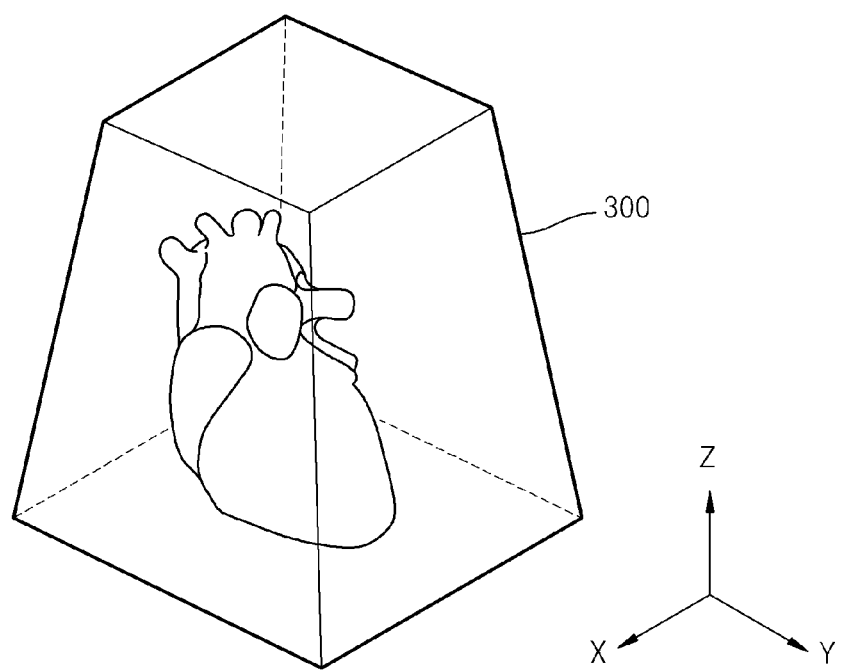
FIG. 2 illustrates an embodiment that an image processing apparatus of FIG. 1 acquires 3D volume data.

FIG. 2 illustrates an embodiment that the image processing apparatus 110 of FIG. 1 acquires 3D volume data 300.

Referring to FIGS. 1 and 2, the 3D volume data 300 is of the heart 210 of the subject 200. The 3D volume data 300 may include a plurality of voxel values. The voxel values may indicate the brightness and/or color of images. The position of each voxel value of the 3D volume data may be distinguished from 3D coordinates (x, y, z) in an XYZ coordinate system.

If the diagnosis imaging apparatus 100 is an ultrasound imaging apparatus, 3D volume data 300 of the heart 210 may be acquired by three-dimensional echocardiography.

The 3D volume data 300 may be acquired by scanning the heart 210 of the subject 210 using a scanning apparatus (not shown). For example, the scanning apparatus may be a probe. The scanning apparatus may be included in the diagnosis imaging apparatus 110 or may be an external apparatus connectable to the diagnosis imaging apparatus 110. The image processing apparatus 110 may receive the 3D volume data 300 from the scanning apparatus. In some embodiments, the 3D volume data 300 acquired from the scanning apparatus may be stored in the storing apparatus 130, and the image processing apparatus 110 may load the 3D volume data 300 from the storing apparatus 130.

The image processing apparatus 110 may acquire a 2D plane image of a specific cross-section based on the 3D volume data 300. The image processing apparatus 110 may acquire a 3D image of a specific part at a specific view point based on the 3D volume data 300. The image processing apparatus 110 may rotate the 3D volume data 300 in a specific direction by a specific angle.

The image processing apparatus 110 may detect a first point and a second point on the heart wall of a valve of interest based on the 3D volume data 300. In some embodiments, the valve of interest may be the aortic valve, the mitral valve, the pulmonary valve, or the tricuspid valve.

The image processing apparatus 110 may rotate the 3D volume data 300 to make a virtual line connecting the first point and the second point be parallel with a datum plane. The datum plane is a predefined virtual plane based on the 3D volume data 300.

Figure 3:
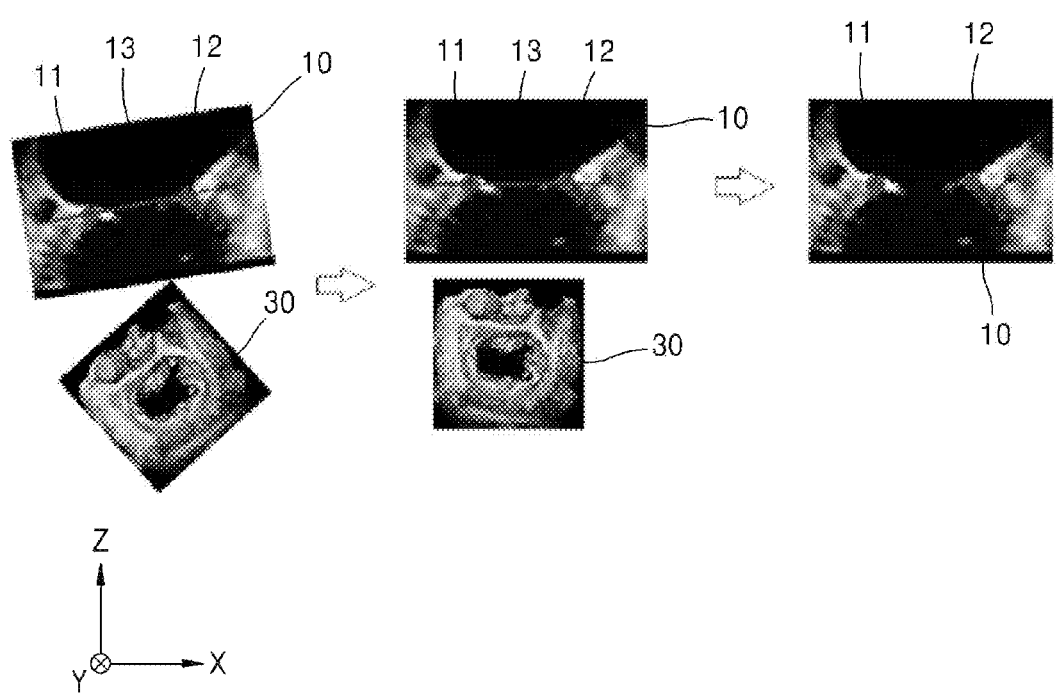
FIG. 3 illustrates an embodiment of rotating the 3D volume data of FIG. 2 in the image processing apparatus of FIG. 1.

FIG. 3 illustrates an embodiment of rotating the 3D volume data 300 of FIG. 2, performed by the image processing apparatus 110 of FIG. 1.

Referring to FIGS. 1 to 3, the image processing apparatus 110 detects a first point 11 and a second point 12 on the heart wall of the valve of interest from the 3D volume data 300. In FIG. 3, for the convenience of description, a 2D cross-sectional image 10 of the valve of interest and a 3D image corresponding to the 2D cross-sectional image 10, acquired from the 3-D volume data 300, are illustrated.

The image processing apparatus 110 may detect the heart wall and the annulus, which is annular, based on the 3D volume data 300. The image processing apparatus 110 may detect the heart wall and the annulus based on a difference in brightness of the voxel values of the 3D volume data 300. A first point 11 and a second point 12 may be detected from locations where the heart wall and the annulus of the valve of interest intersect The image processing apparatus 110 rotates the 3D volume data 300 to make the virtual line 13 connecting the first point 11 and the second points 12 be parallel with the datum plane. The datum plane in FIG. 3 may be an XY plane, but is not limited thereto. The datum plane may be determined depending on the type of the valve of interest.

The image processing apparatus 110 may analyze and process voxel values of the 3D volume data 300, thereby automatically detecting the first point 11 and the second point 12 and an angle between the virtual line 13 and the datum plane (for example, an XY plane, and may automatically rotate the 3D volume data 300.

The image processing apparatus 110 acquires a 3D standard view of the valve of interest based on the rotated 3D volume data 300.

Figure 4:
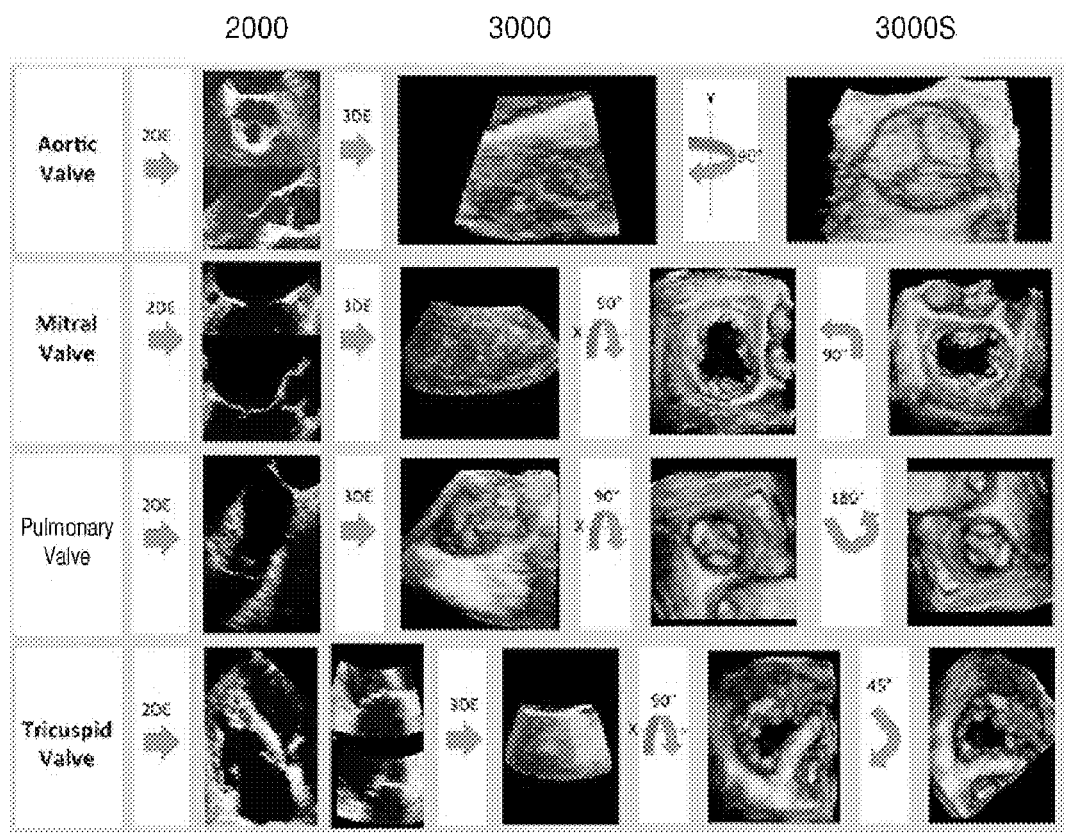
FIG. 4 illustrates an embodiment that the image processing apparatus of FIG. 1 acquires a 3D standard view of each valve of interest.

FIG. 4 illustrates an embodiment that the image processing apparatus 110 of FIG. 1 acquires a 3D standard view of each valve of interest.

Referring to FIGS. 1 and 4, the image processing apparatus 110 determines a bi-plane image 2000 of the valve of interest based on the rotated 3D volume data. The display apparatus 120 may display the bi-plane image 2000 corresponding to the valve of interest. The bi-plane image 2000 may be determined based on a user input received via the input apparatus 140. The user may identify the position of the heart from the bi-plane image 2000 displayed on the display apparatus 120.

Once the bi-plane image 2000 is determined, the image processing apparatus 110 acquires a 3D image 3000 of the valve of interest corresponding to the bi-plane image 200 by mode changing to a 3D mode. The display apparatus 120 may display the 3D image 3000.

The image processing apparatus 110 may acquire a 3D standard view 3000S of the valve of interest by rotating the 3D image 3000 in a specific direction by a specific angle. The specific direction and the specific angle may be determined depending on the type of the valve of interest. For example, if the valve of interest is the mitral valve, the 3D image 3000 may be rotated around the X-axis by 90 degrees, and then be rotated counterclockwise by 90 degrees so that the 3D standard view 3000S of the mitral valve may be acquired.

The image processing apparatus 110 may automatically acquire the 3D standard view 3000S through rotating the 3D image 3000 in a predetermined specific direction by a predetermined specific angle.

In some embodiments, the specific direction and specific angle may be determined based on a user input via the input apparatus 140, and the image processing apparatus 110 may rotate the 3D image 3000 in the specific direction by the specific angle that are determined based on the user input to acquire the 3D standard view 3000S.

Figure 5:
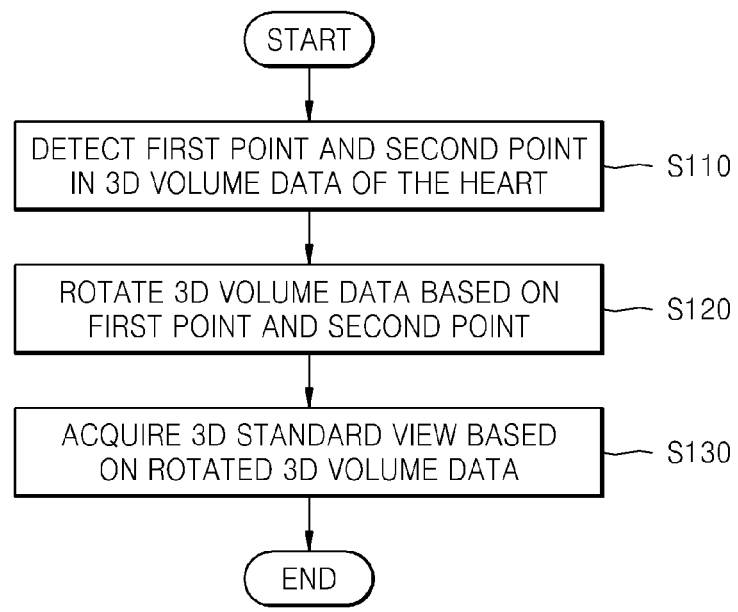
FIG. 5 is a flowchart of an operation method of a diagnosis imaging apparatus, according to an embodiment of the present invention.

FIG. 5 is a flowchart of an operation method of a diagnosis imaging apparatus, according to an embodiment of the present invention.

Referring to FIG. 5, the diagnosis imaging apparatus may detect a first point and a second point on the heart wall of a valve of interest in the 3D volume data of the heart of a subject (Operation S110). The diagnosis processing apparatus may rotate the 3D volume data 300 to make a virtual line connecting the first point and the second point be parallel with a datum plane (S120). The diagnosis imaging apparatus acquires a 3D standard view of the valve of interest based on the rotated 3D volume data 300 (S130).

The operation method of FIG. 5 may be performed by the diagnosis imaging apparatus 100 of FIG. 1. The relevant descriptions described above with reference to FIGS. 1 to 4 are not repeated herein to avoid redundancy, and thus, may be referred to as a description of each operation of the method.

According to the embodiments described above, diagnosis imaging apparatuses and operating methods thereof are efficient.

A non-tilted, exact 3D standard view may be acquired by correcting the angle of the 3D volume data based on position information of the valve of interest. The correction of the angle of the 3D volume data may be automatic so that a user's convenience in manipulating the diagnosis imaging apparatus may be improved. The 3D volume data processing time for which the user acquires a desired 3D image may be reduced. Therefore, the time it takes to measure and evaluate the characteristics of the heart of the subject and make a diagnosis may be reduced. The acquisition of the exact 3D standard view may increase diagnosis accuracy.

The embodiments of the method described above may be written as computer programs and can be implemented in general-use digital computers that execute the programs using a computer-readable recording medium. Data used in the above-described embodiments can be recorded on a medium in various means. Examples of the computer-readable recording medium include magnetic storage media (e.g., ROM, RAM, USB, floppy disks, hard disks, etc.), optical recording media (e.g., CD-ROMs or DVDs), and peripheral component interfaces (PCI) (e.g., PCI-express or Wifi).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A diagnosis imaging apparatus comprising:
    an image processor for detecting a first point and a second point on a heart wall of a valve of interest in a 3D volume data of a heart of a subject, rotating the 3D volume data to make a virtual line connecting the first point and the second point be parallel with a datum plane, and acquiring a 3D standard view of the valve of interest based on the rotated 3D volume data; and
    a display for displaying the 3D standard view,
    wherein the image processor determines a bi-plane image of the valve of interest based on the rotated 3D volume data, changes a current mode to a 3D mode to acquire a 3D image corresponding to the bi-plane image, and rotates the 3D image in a specific direction by a specific angle, thereby acquiring the 3D standard view.

2. The diagnosis imaging apparatus of claim 1, wherein the image processor detects the heart wall and an annulus, the annulus which is annular, of the valve of interest based on the 3D volume data, and detects the first point and the second point from locations where the heart wall and the annulus intersect.

3. The diagnosis imaging apparatus of claim 1, further comprising an input, wherein the bi-plane image is determined based on a first user input received via the input.

4. The diagnosis imaging apparatus of claim 3, wherein the specific direction and the specific angle is determined depending on the type of the valve of interest.

5. The diagnosis imaging apparatus of claim 3, wherein the specific direction and the specific angle are determined based on a second user input received via the input.

6. A diagnosis imaging apparatus comprising:
    a scanner for acquiring a 3D volume data by scanning a heart of a subject; and
    an image processor for detecting a first point and a second point on a heart wall of a valve of interest in the 3D volume data, rotating the 3D volume data to make a virtual line connecting the first point and the second point be parallel with a datum plane, and acquiring a 3D standard view of the valve of interest based on the rotated 3D volume data,
    wherein the image processor determines a bi-plane image of the valve of interest based on the rotated 3D volume data, changes a current mode to a 3D mode to acquire a 3D image corresponding to the bi-plane image, and rotates the 3D image in a specific direction by a specific angle, thereby acquiring the 3D standard view.

7. An operation method of a diagnosis imaging apparatus, the method comprising:
    detecting a first point and a second point on a heart wall of a valve of interest in a 3D volume data of a heart of a subject;
    rotating the 3D volume data to make a virtual line connecting the first point and the second point be parallel with a datum plane;
    acquiring a 3D standard view of the valve of interest based on the rotated 3D volume data,
    wherein the acquiring of the 3D standard view comprises:
    determining a bi-plane image of the valve of interest based on the rotated 3D volume data;
    changing a current mode to a 3D mode to acquire a 3D image corresponding to the bi-plane image; and
    rotating the 3D image in a specific direction by a specific angle, thereby acquiring the 3D standard view.

8. The operation method of claim 7, further comprising displaying the 3D standard view.

9. The operation method of claim 7, wherein the detecting of the first point and the second point comprises:
    detecting the heart wall and an annulus of the valve of interest, the annulus which is annular, based on the 3D volume data; and
    detecting the first point and the second point from locations where the heart wall and the annulus intersect.

10. The operation method of claim 7, wherein the determining of the bi-plane image comprises: receiving a first user input; and determining the bi-plane image based on the first user input.

11. The operation method of claim 10, wherein the specific direction and the specific angle is determined depending on the type of the valve of interest.

12. The operation method of claim 10, wherein the acquiring of the 3D standard view comprises:
    receiving a second user input; and
    determining the specific direction and the specific angle based on the second user input.

13. A non-transitory computer-readable recording medium having embodied thereon a program for executing the operation method of a diagnosis imaging apparatus according to claim 7.

* * * * *